United States Patent
Xu et al.

(10) Patent No.: US 12,511,448 B2
(45) Date of Patent: Dec. 30, 2025

(54) POWER TRANSMISSION AND TRANSFORMATION PROJECT ACCEPTANCE METHOD BASED ON BUILDING INFORMATION MODELING (BIM) AND POINT CLOUD MEASUREMENT

(71) Applicants: State Grid Jiangsu Electric Power Engineering Consulting Co., Ltd., Jiangsu (CN); State Grid Jiangsu Electric Power Co., Ltd., Jiangsu (CN)

(72) Inventors: Jianming Xu, Jiangsu (CN); Bing Chen, Jiangsu (CN); Aigen Pei, Jiangsu (CN); Hongping Xie, Jiangsu (CN); Changqing Du, Jiangsu (CN); Bin Bo, Jiangsu (CN); Zhangxuan Wang, Jiangsu (CN); Jiao Zhu, Jiangsu (CN); Chao Han, Jiangsu (CN); Zhou Fan, Jiangsu (CN); Wentao Shen, Jiangsu (CN); Jian Du, Jiangsu (CN); Lai Xu, Jiangsu (CN)

(73) Assignees: State Grid Jiangsu Electric Power Engineering Consulting Co., Ltd., Nanjing (CN); State Grid Jiangsu Electric Power Co., Ltd., Nanjing (CN)

( * ) Notice: Subject to any disclaimer, the term of this patent is extended or adjusted under 35 U.S.C. 154(b) by 972 days.

(21) Appl. No.: 17/640,347

(22) PCT Filed: Jan. 12, 2022

(86) PCT No.: PCT/CN2022/071678
§ 371 (c)(1),
(2) Date: Mar. 4, 2022

(87) PCT Pub. No.: WO2023/279695
PCT Pub. Date: Jan. 12, 2023

(65) Prior Publication Data
US 2025/0068783 A1 Feb. 27, 2025

(30) Foreign Application Priority Data
Jul. 6, 2021 (CN) .......................... 202110763294.3

(51) Int. Cl.
*G06F 30/13* (2020.01)

(52) U.S. Cl.
CPC ................................... *G06F 30/13* (2020.01)

(58) Field of Classification Search
CPC .......... G06F 30/00; G06F 30/13; G06F 18/24; Y04S 10/50; G06T 17/00; G06T 3/04038;
(Continued)

(56) References Cited

FOREIGN PATENT DOCUMENTS

| CN | 111102926 A | * | 5/2020 | ............... G06T 7/11 |
| CN | 112489028 A | * | 3/2021 | ............... G06T 7/001 |
| WO | WO-2019090072 A1 | * | 5/2019 | ............... G01C 11/04 |

* cited by examiner

Primary Examiner — Cedric Johnson

(57) ABSTRACT

A power transmission and transformation project acceptance method based on building information modeling (BIM) and point cloud measurement includes: S1: constructing a BIM model based on a design drawing, where the BIM model includes standard parameters of key components of a power transmission and transformation project; S2: obtaining point cloud data, and constructing a point cloud data model based on the point cloud data, where the point cloud data model includes actual parameters of the key components of the power transmission and transformation project; S3: comparing the BIM model with the point cloud data model to obtain construction acceptance data; and S4: visualizing the construction acceptance data and outputting an acceptance report to complete acceptance of the power transmission and transformation project. The BIM model and the point cloud data model are compared to implement rapid and efficient acceptance of the power transmission and transformation project.

6 Claims, 1 Drawing Sheet

(58) Field of Classification Search
CPC .............. G06T 5/20; G06T 2207/10028; G06T 2207/30184; G06T 5/70
USPC ..................................................... 703/18, 13
See application file for complete search history.

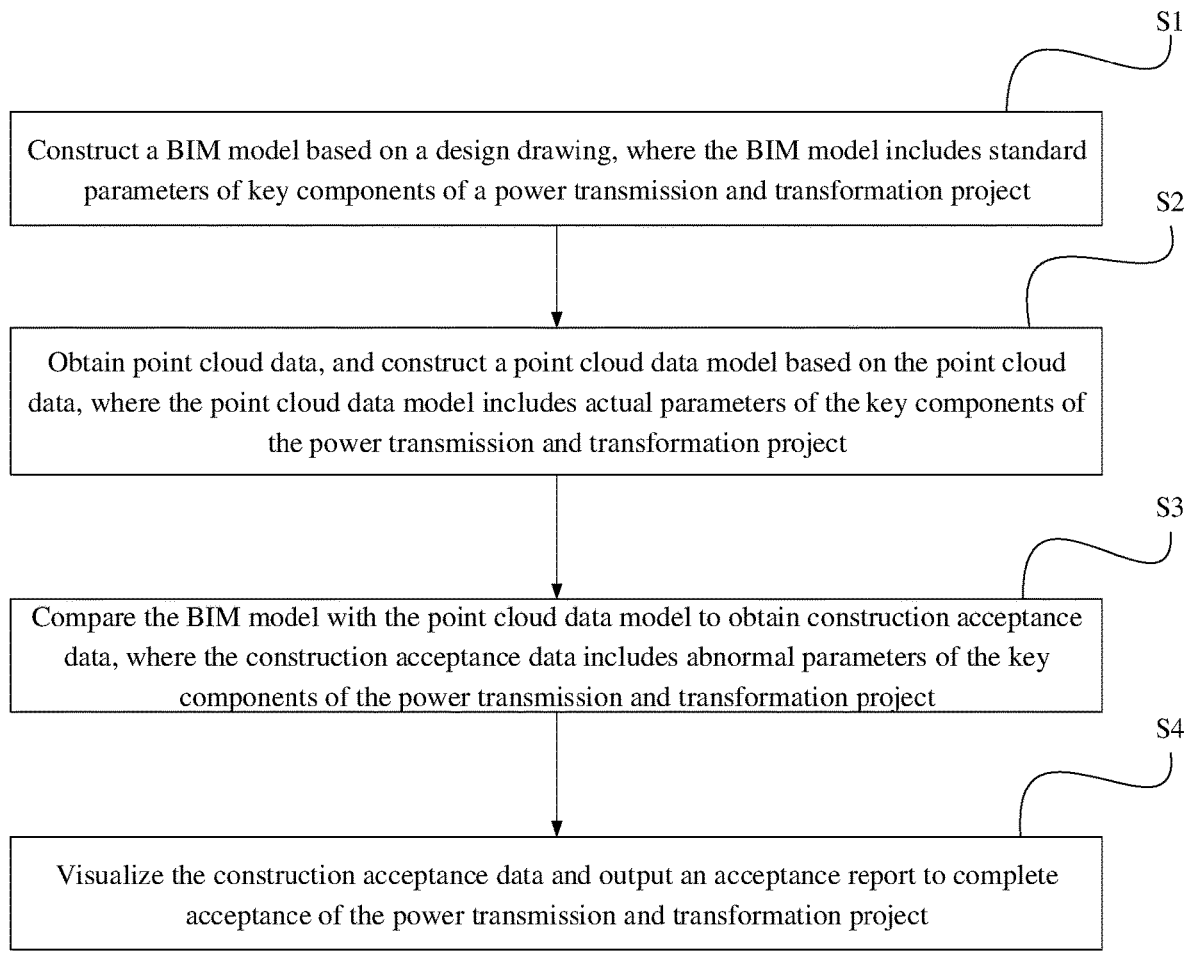

POWER TRANSMISSION AND TRANSFORMATION PROJECT ACCEPTANCE METHOD BASED ON BUILDING INFORMATION MODELING (BIM) AND POINT CLOUD MEASUREMENT

TECHNICAL FIELD

The present disclosure relates to the technical field of acceptance of power transmission and transformation projects, and specifically, to a power transmission and transformation project acceptance method based on building information modeling (BIM) and point cloud measurement.

BACKGROUND

Tower erection, wire erection, accessory installation, and other works involved in a power transmission and transformation project are carried out at high altitudes. At present, during acceptance of the power transmission and transformation project, acceptance for owners and supervisors basically rely on high-altitude inspection by related workers. Traditional acceptance of the power transmission and transformation project is too dependent on the workers' experience and operation levels. The inspection process is cumbersome, measurement precision is difficult to control, and measurement results cannot be reused. A lot of time and labor are consumed, an acceptance effect is mediocre, and the acceptance by the workers is accompanied by specific safety risks and is prone to personal injury and death accidents such as falls. An effective solution has not been proposed to resolve problems of low efficiency and accuracy of an existing transmission line acceptance method.

SUMMARY

The present disclosure provides a power transmission and transformation project acceptance method based on BIM and point cloud measurement to implement rapid and efficient acceptance of a completed power transmission and transformation project.

To achieve the foregoing objective, the present disclosure adopts the following technical solution: A power transmission and transformation project acceptance method based on BIM and point cloud measurement includes the following steps:

S1: constructing a BIM model based on a design drawing, where the BIM model includes standard parameters of key components of a power transmission and transformation project;

S2: obtaining point cloud data, and constructing a point cloud data model based on the point cloud data, where the point cloud data model includes actual parameters of the key components of the power transmission and transformation project;

S3: comparing the BIM model with the point cloud data model to obtain construction acceptance data, where the construction acceptance data includes abnormal parameters of the key components of the power transmission and transformation project; and S4: visualizing the construction acceptance data and outputting an acceptance report to complete acceptance of the power transmission and transformation project.

Preferably, in step S2, the point cloud data may be obtained by an unmanned aerial vehicle (UAV) equipped with a three-dimensional (3D) laser scanner.

Preferably, a method for obtaining the point cloud data by the UAV may be as follows: presetting an acquisition frequency and resolution of the 3D laser scanner and an acquisition point of the UAV; and automatically planning, by the UAV, a flight path based on the acquisition point, flying based on the automatically planned flight path, and acquiring the point cloud data through the 3D laser scanner. When flying to the acquisition point, the UAV automatically hovers for a specific period of time to acquire the point cloud data. When encountering an obstacle during the flight, the UAV automatically deflects by a specific angle to avoid the obstacle.

Preferably, the 3D laser scanner may be a FARO 3D laser scanner or Z+F PROFILER 9012 3D laser scanner.

Preferably, the constructing a point cloud data model in step S2 may specifically include the following steps:

S51: classifying the point cloud data based on types of the key components of the power transmission and transformation project;

S52: processing the classified point cloud data by image processing technologies;

S53: splicing processed point cloud data; and

S54: performing modeling based on spliced point cloud data to obtain the point cloud data model.

Preferably, the processing the classified point cloud data by image processing technologies in step S52 may specifically include: removing invalid noise point clouds in the point cloud data by an image denoising technology, and removing redundant point clouds in the point cloud data by an image enhancement technology.

Preferably, the comparing the BIM model with the point cloud data model to obtain construction acceptance data in step S3 may specifically include: placing the BIM model and the point cloud data model in a same coordinate system for overlapping comparison, determining whether there is an anomaly, and outputting the construction acceptance data.

Preferably, the determining whether there is an anomaly may specifically include: if the BIM model and the point cloud data model completely overlap, determining that there is no anomaly; if the BIM model and the point cloud data model do not overlap at all, determining that there is an anomaly; or if the BIM model and the point cloud data model partially overlap, determining a difference between parameters that do not coincide in the BIM model and the point cloud data model, and if the difference does not exceed a preset threshold, determining that there is no anomaly, or if the difference exceeds the preset threshold, determining that there is an anomaly.

The present disclosure has the following beneficial effects: In the present disclosure, the power transmission and transformation project acceptance method based on autonomous flight of the UAV and 3D laser point clouds is designed. Automatic driving of the UAV and automatic acquisition of the point cloud data are implemented. Precise processing of the point cloud data is implemented through high-precision image processing technologies. The BIM model and the point cloud data model are compared to implement rapid and efficient acceptance of the completed power transmission and transformation project.

BRIEF DESCRIPTION OF THE DRAWINGS

FIG. 1 is an overall schematic diagram of the present disclosure.

DETAILED DESCRIPTION

The technical solutions of the embodiments of the present disclosure will be clearly and completely described below with reference to FIG. 1 of the present disclosure. Apparently, the described embodiments are merely some rather than all of the embodiments of the present disclosure. Based on the embodiments of the present disclosure, all other embodiments obtained by the person of ordinary skill in the art without creative efforts shall fall within the protection scope of the present disclosure.

It should be understood that in the description of the present disclosure, terms such as "counterclockwise", "clockwise", "longitudinal", "transverse", "upper", "lower", "front", "rear", "left", "right", "vertical", "horizontal", "top", "bottom", "inside", and "outside" indicate the orientation or position relationships based on the drawings. They are merely intended to facilitate description of the present disclosure, rather than to indicate or imply that the mentioned device or elements must have a specific orientation and must be constructed and operated in a specific orientation. Therefore, these terms should not be construed as a limitation to the present disclosure.

A power transmission and transformation project acceptance method based on BIM and point cloud measurement includes the following steps:

S1: Construct a BIM model based on a design drawing, where the BIM model includes standard parameters of key components of a power transmission and transformation project; the key components of the power transmission and transformation project include an equipment support, an insulator string, and a metal fitting; and an attribute manager of the BIM model stores a large amount of basic geometric information data, including diameters, total lengths, center distances, and other key data.

S2: Obtain point cloud data, and construct a point cloud data model based on the point cloud data, where the point cloud data model includes actual parameters of the key components of the power transmission and transformation project.

Specifically, before acquisition, a worker needs to formulate an acquisition plan and plan an acquisition point based on an on-site situation and the BIM model, and set an acquisition frequency and resolution of a 3D laser scanner and working parameters of a UAV by an intelligent device (such as a mobile phone, a computer, or a radio remote control). The working parameters include the acquisition point, a flight speed, and hovering duration. The flight speed of the UAV is 5 km/h to 12 km/h, and the hovering duration is 3 s. The acquisition resolution of the 3D laser scanner is 6 to 7. The acquisition frequency of the laser scanner is 1 Hz to 1,000 Hz. The worker can set the parameters as required. During the acquisition, the UAV automatically plans a flight path based on the preset acquisition point and flies based on the preset flight speed and the flight path. When encountering an obstacle during the flight, the UAV can automatically deflect by a specific angle. Specifically, the UAV deflects by 150 each time and stops deflecting until there is no obstacle. This can effectively reduce risks of yaw and collision with an obstacle, and ensure security of the UAV. After the deflection, the UAV can replan the flight path. When the UAV is about 20 meters away from the preset acquisition point of the power transmission and transformation project, the UAV slowly approaches the acquisition point. The UAV can hover. After the UAV stably hovers, the point cloud data is acquired through the small-sized 3D laser scanner with which the UAV is equipped. The 3D laser scanner with which the UAV is equipped is a FARO 3D laser scanner or Z+F PROFILER 9012 3D laser scanner.

It should be noted that in step S2, that the point cloud data model is built may specifically include the following steps:

S51: Classify the point cloud data based on types of the key components of the power transmission and transformation project.

S52: Process the classified point cloud data by image processing technologies. That is, remove invalid noise point clouds in the point cloud data by an image denoising technology, and remove redundant point clouds in the point cloud data by an image enhancement technology.

Specifically, noise point clouds that conform to a Gaussian distribution are suppressed through Gaussian filtering. Each original point is replaced by a statistical average of each numerical point through average filtering. Point cloud positions are changed, and the invalid noise point clouds are removed such that the point clouds can be effectively denoised.

S53: Splice processed point cloud data. Specifically, the splicing is implemented by point cloud preprocessing software (SCENE or Autodesk ReCap). The software automatically corrects, calibrates, and merges the point cloud data.

S54: Perform modeling based on spliced point cloud data to obtain the point cloud data model.

S3: Compare the BIM model with the point cloud data model to obtain construction acceptance data, where the construction acceptance data includes abnormal parameters of the key components of the power transmission and transformation project.

Specifically, that the BIM model is compared with the point cloud data model to obtain the construction acceptance data may specifically include: Place the BIM model and the point cloud data model in a same coordinate system for overlapping comparison. The comparison is performed in the same coordinate system to form a same data system such that the standard parameters of the power transmission and transformation project can one-to-one correspond to the actual parameters. When it is determined whether there is an anomaly and the construction acceptance data is output, a determining result is accurate, and data transmission is efficient. If the BIM model and the point cloud data model completely overlap, it is determined that there is no anomaly. If the BIM model and the point cloud data model do not overlap at all, it is determined that there is an anomaly. If the BIM model and the point cloud data model partially overlap, a difference between parameters that do not coincide in the BIM model and the point cloud data model is determined. If the difference does not exceed a preset threshold, it is determined that there is no anomaly. If the difference exceeds the preset threshold, it is determined that there is an anomaly. The anomaly indicates that the project does not meet an acceptance criterion. A tangent tower is used as an example. An inclination rate of the tangent tower is an important criterion for acceptance of the tangent tower, and is generally not greater than 0.24%. If a difference between an actual inclination rate of the tangent tower and a standard inclination rate is greater than 0.24%, the tangent tower does not meet the acceptance criterion and is considered unqualified.

S4: Visualize the construction acceptance data and output an acceptance report to complete acceptance of the power transmission and transformation project.

Specifically, the acceptance data of the power transmission and transformation project can be intuitively displayed through a visualization window such as a display. The displayed content includes a comparison chart of the BIM model and the point cloud data model, and the standard parameters, actual parameters, and abnormal parameters of the key components of the power transmission and transformation project in the two models. The acceptance report can be automatically generated through a computer. In this way, it is convenient to control the acceptance of the power transmission and transformation project.

In summary, the power transmission and transformation project acceptance method based on autonomous flight of the UAV and 3D laser point clouds is designed in the present disclosure to complete acceptance system demonstration of the power transmission and transformation project, so as to implement rapid and efficient acceptance of the completed power transmission and transformation project.

The invention claimed is:

1. A power transmission and transformation project acceptance method based on building information modeling (BIM) and point cloud measurement, comprising following steps:
   S1: constructing a BIM model based on a design drawing, wherein the BIM model comprises standard parameters of key components of a power transmission and transformation project;
   S2: obtaining point cloud data, and constructing a point cloud data model based on the point cloud data, wherein the point cloud data model comprises actual parameters of the key components of the power transmission and transformation project;
   S3: comparing the BIM model with the point cloud data model to obtain construction acceptance data, wherein the construction acceptance data comprises abnormal parameters of the key components of the power transmission and transformation project; and
   S4: visualizing the construction acceptance data and outputting an acceptance report to complete acceptance of the power transmission and transformation project;
   wherein in step S2, the point cloud data is obtained by an unmanned aerial vehicle (UAV) equipped with a three-dimensional (3D) laser scanner;
   wherein a method for obtaining the point cloud data by the UAV is as follows: presetting an acquisition frequency and resolution of the 3D laser scanner and an acquisition point of the UAV; and automatically planning, by the UAV, a flight path based on the acquisition point, flying based on the automatically planned flight path, and acquiring the point cloud data through the 3D laser scanner, wherein when flying to the acquisition point, the UAV automatically hovers for a specific period of time to acquire the point cloud data, and when encountering an obstacle during the flight, the UAV automatically deflects by a specific angle to avoid the obstacle.

2. The power transmission and transformation project acceptance method based on BIM and point cloud measurement according to claim 1, wherein the 3D laser scanner is a FARO 3D laser scanner or Z+F PROFILER 9012 3D laser scanner.

3. The power transmission and transformation project acceptance method based on BIM and point cloud measurement according to claim 1, wherein the constructing a point cloud data model in step S2 comprises following steps:
   S51: classifying the point cloud data based on types of the key components of the power transmission and transformation project;
   S52: processing the classified point cloud data by image processing technologies;
   S53: splicing processed point cloud data; and
   S54: performing modeling based on spliced point cloud data to obtain the point cloud data model.

4. The power transmission and transformation project acceptance method based on BIM and point cloud measurement according to claim 3, wherein the processing the classified point cloud data by image processing technologies in step S52 specifically comprises: removing invalid noise point clouds in the point cloud data by an image denoising technology, and removing redundant point clouds in the point cloud data by an image enhancement technology.

5. The power transmission and transformation project acceptance method based on BIM and point cloud measurement according to claim 1, wherein the comparing the BIM model with the point cloud data model to obtain construction acceptance data in step S3 comprises: placing the BIM model and the point cloud data model in a same coordinate system for overlapping comparison, determining whether there is an anomaly, and outputting the construction acceptance data.

6. The power transmission and transformation project acceptance method based on BIM and point cloud measurement according to claim 5, wherein the determining whether there is an anomaly comprises: if the BIM model and the point cloud data model completely overlap, determining that there is no anomaly; if the BIM model and the point cloud data model do not overlap at all, determining that there is an anomaly; or if the BIM model and the point cloud data model partially overlap, determining a difference between parameters that do not coincide in the BIM model and the point cloud data model, and if the difference does not exceed a preset threshold, determining that there is no anomaly, or if the difference exceeds the preset threshold, determining that there is an anomaly.

* * * * *